US006430315B1

(12) United States Patent
Makram-Ebeid (10) Patent No.: US 6,430,315 B1
(45) Date of Patent: Aug. 6, 2002

(54) IMAGE PROCESSING METHOD INCLUDING A CHAINING STEP, AND MEDICAL IMAGING APPARATUS INCLUDING MEANS FOR CARRYING OUT THIS METHOD

(75) Inventor: Shérif Makram-Ebeid, Dampierre (FR)

(73) Assignee: Koninklijke Philips Electronics, N.V., Eindhoven (NL)

( * ) Notice: Subject to any disclaimer, the term of this patent is extended or adjusted under 35 U.S.C. 154(b) by 0 days.

(21) Appl. No.: 09/082,444

(22) Filed: May 20, 1998

(30) Foreign Application Priority Data

May 23, 1997 (FR) .............................. 97 06339

(51) Int. Cl.$^7$ .............................. G06K 9/48; G06K 9/56
(52) U.S. Cl. ...................................... 382/197; 382/205
(58) Field of Search .......................... 382/197–199, 382/203, 205, 273, 242

(56) References Cited

U.S. PATENT DOCUMENTS

| | | | | |
|---|---|---|---|---|
| 3,609,685 A | * | 9/1971 | Deutsch ...................... | 382/198 |
| 4,183,013 A | * | 1/1980 | Agrawala et al. ........... | 382/203 |
| 4,490,848 A | * | 12/1984 | Beall et al. .................. | 382/197 |
| 4,630,306 A | * | 12/1986 | West et al. .................. | 382/197 |
| 4,791,581 A | * | 12/1988 | Ohba .......................... | 364/512 |
| 5,033,099 A | * | 7/1991 | Yamada et al. ............. | 382/197 |
| 5,239,591 A | * | 8/1993 | Ranganath ..................... | 382/6 |
| 5,289,373 A | * | 2/1994 | Zarge et al. .................... | 382/6 |
| 5,379,350 A | * | 1/1995 | Shimazu et al. .............. | 382/22 |
| 5,920,648 A | * | 7/1999 | Fujimoto .................... | 382/197 |
| 5,978,520 A | * | 11/1999 | Maruyama et al. ......... | 382/197 |
| 6,047,080 A | * | 4/2000 | Chen et al. .................. | 382/128 |

FOREIGN PATENT DOCUMENTS

| | | | |
|---|---|---|---|
| DE | 4304860 | 8/1994 | ........... G06F/15/68 |
| EP | 0594041 A1 | 10/1993 | ............ H05K/9/00 |

OTHER PUBLICATIONS

Sun, Ying, "Automated identification of vessel contours in coronary arteriograms by an adaptive tracking algorithm", pp. 78–88, Mar. 1989.*
"Object Delineation in Noisy Imaged by a Modified Policy–Iteration Method", by Adrie C.M. Dumay, Harielle N.A.J. Classens et al., in IEEE Transactions on Pattern Analysis and Machine Intelligence, pp. 952–958.

* cited by examiner

Primary Examiner—Amelia M. Au
Assistant Examiner—Martin E Miller
(74) Attorney, Agent, or Firm—John Vodopia (57) ABSTRACT

An image processing method which includes the acquisition (10) of an intensity image (J) formed by a matrix of points (A) having non-binary intensity values and representing filiform objects, and also includes steps for the detection of filiform objects, which steps include: automatic determination (20) of an intensity vector field ($\vec{V}$), forming a state image constituted by characteristics concerning magnitudes and angles [$\|\vec{V}\|,\theta$] of intensity vectors a the various points (A) of the intensity image, an operation (30) for chaining the points of an individual filiform object by means of automatic filtering [Q(i)] of the state image, thus performing a selection of a dense and continuous field of intensity vectors corresponding to points of the filiform object.

10 Claims, 5 Drawing Sheets

IMAGE PROCESSING METHOD INCLUDING A CHAINING STEP, AND MEDICAL IMAGING APPARATUS INCLUDING MEANS FOR CARRYING OUT THIS METHOD

BACKGROUND OF THE INVENTION

1. Field of the Invention

The invention relates to an image processing method which includes the acquisition of an intensity image formed by a matrix of points having non-binary intensity values, representing filiform objects, which method also includes steps for the detection of filiform objects.

The invention is used for the manufacture of, for example, X-ray apparatus

2. Description of the Related Art

A method for the detection of edges is already known from the publication "IEEE TRANSACTIONS ON PATTERN ANALYSIS AND MACHINE INTELLIGENCE, Vol. 14, No. 9, September 1992, Object Delineation in Noisy Images by a Modified Policy-Iteration method, by Adrie C. M. Dumay, Harielle N. A. J. Claessens et al., pp. 952–958".

The cited publication describes an algorithm for the detection of contour lines of isolated objects in noisy images; it is a version of a method which is well known to those skill in the art as the dynamic programming method. The dynamic programming method can be applied in two circumstances: it is a method for searching the shortest path for linking group of points at minimum cost. It is necessary to supervise this method; therefore, it cannot be automated.

SUMMARY OF THE INVENTION

It is an object of the present invention to propose an image processing method as d fined above which can be applied in more circumstances than the known dynamic programming method: the calculation steps must be performed in an automatic fashion; the umber of steps must also be as small as possible; these steps must determine the shortest th for linking a group of points relating to an individual filiform object, at a cost which is as low as possible; the path chosen should include the largest possible number of points of e filiform object, and hence should be as long and as regular as possible in the image.

The condition that the path found should have the highest possible density of point relating to the filiform object is not known from the dynamic programming method.

According to the invention this problem is solved by an image processing method which includes the acquisition of an intensity image formed by a matrix of points having non-binary intensity values, representing filiform objects, which method also includes steps for the detection of filiform objects, which steps include:

automatic determination of a field of intensity vectors ($\vec{V}$), forming an image of states constituted by characteristics concerning magnitudes and angles [$\|\vec{V}\|,\theta$] of intensity vectors a the various points of the intensity image, an operation for chaining the points of an individual filiform object by means of automatic filtering [Q(i)] of the image of the states, thus performing a selection of a dense and continuous field of intensity vectors corresponding to points of the filiform object.

This method offers the advantage that it applies to the processing of medical X-ray images which originally have a low contrast, for example arteriograms. In the case of pulmonary arteriogram this method enables, for example the automatic segmentation of arteries different diameters with respect to the background which contains a disturbing representation of ribs. In the case of a cerebral arteriogram this method enables, for example automatic segmentation of criss-crossing arteries. Generally speaking, this method offers the advantage hat it provides improved detection and reconstruction of edges or lines for numerous types of objects represented in images, irrespective of the origin of these images.

A medical imaging apparatus which includes means for carrying out this method comprises:

a system for the acquisition of data representing an image in the form of a two-dimension matrix of points which have non-binary intensity values and are denoted by their co-ordinate in the matrix, an image processing system which includes a microprocessor which has access to the data representing the image and is provided with means for carrying out the steps of the method, and a system for the display and/or storage of image data acquired and/or processed b the method.

BRIEF DESCRIPTION OF THE DRAWING

A method and an apparatus for carrying out the method will be described in detail hereinafter with reference to the accompanying diagrammatic drawings; therein.

DETAILED DESCRIPTION OF THE PREFERRED EMBODIMENT

Figure 7A:
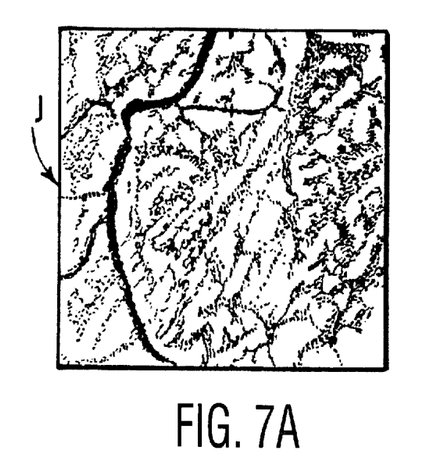
Figure 7B:
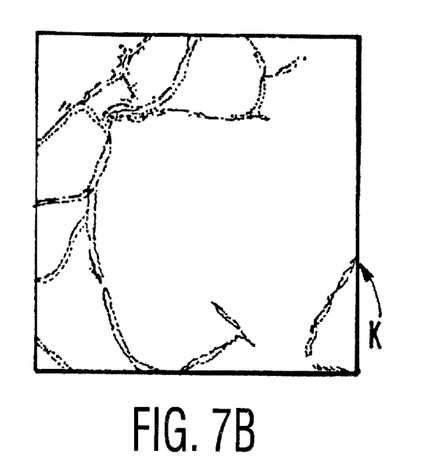
FIG. 7B shows the same arteriogram after processing according to the method for chaining the boundary points of vessels.

The method to be described hereinafter is illustrated in the FIGS. 1A and 1B in the form of diagrams of functional blocks and generally relates to the processing of a non-bin intensity image which is referred to as an original image J, as shown by way of example in FIG. 7A, and represents filiform objects. The filiform objects may be, for example, boundaries of objects, ridges, central lines of objects. This method comprises processing steps which are applied to the original image J and include at least one step 30 for chaining pixels relating to a filiform object. The method preferably also includes a step 40 for tracking each filiform object individually in the image K as illustrated in FIG. 7B.

Figure 1A:
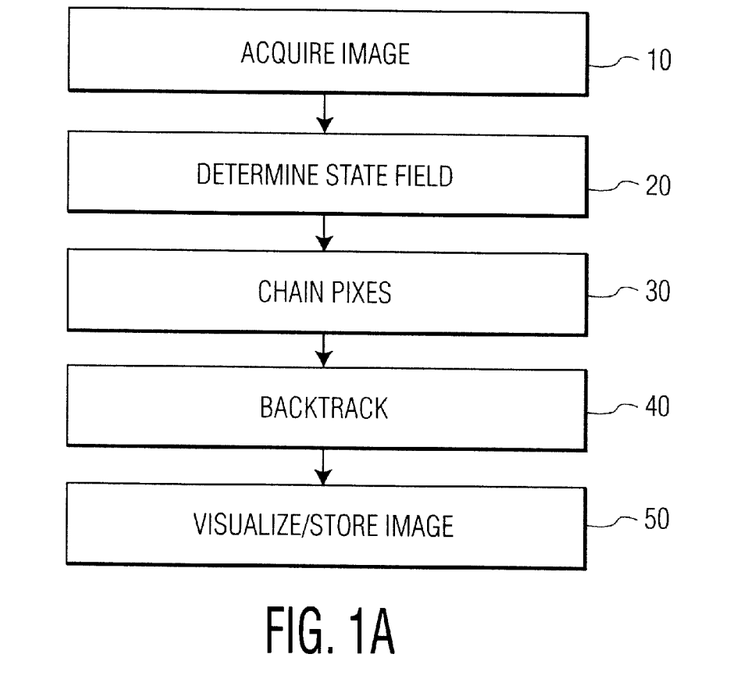
FIGS. 1A and 1B illustrate the method on the basis of functional blocks.
Figure 1B:
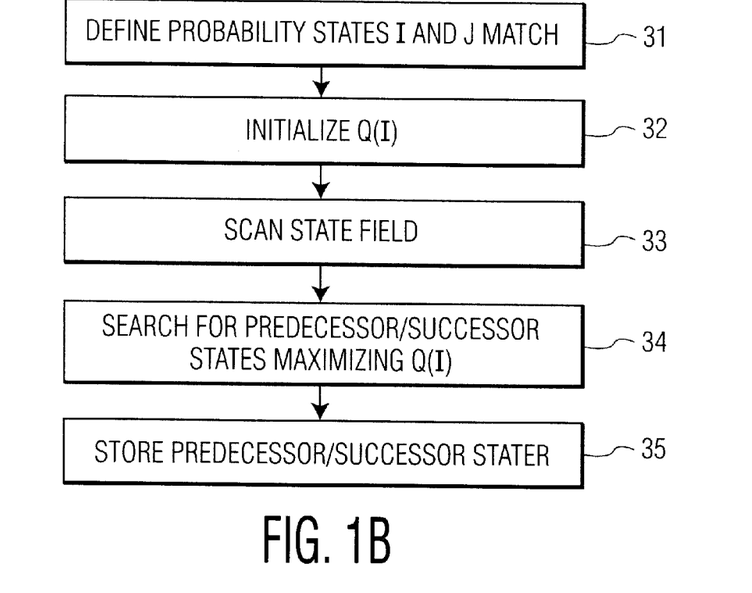

Referring to FIG. 1A, the method includess.

A first, preliminary step 10 for the acquisition of the original image J to be processed. his original image J may be acquired in the form of a two-dimensional matrix of pixels or paints. Referring to the FIGS. 2A, 2B, each pixel A is provided with location co-ordinates x,y in the matrix of the image J with respect to co-ordinate axes $\vec{OX}, \vec{OY}$ and has a non-bin intensity value I(x,y) which can be measured or calculated. The method is not restricted t the processing of two-dimensional images, but can also be applied, for example to the processing of three-dimensional images obtained by means of specific imaging systems enabling th formation of images of volumes. Those skilled in the art can readily extend the method described, by way of example, for a two-dimensional image to a three-dimensional image.

In a second preliminary step 20 the methods determines, for each pixel A, characteristics describing the intensity value of this pixel A with respect to the intensity values of the pixels in its vicinity. These characteristics, referred to hereinafter as "states", comprise the location co-ordinates x,y of the pixel A associated with automatically determined oriented local intensity characteristics.

Figure 2A:
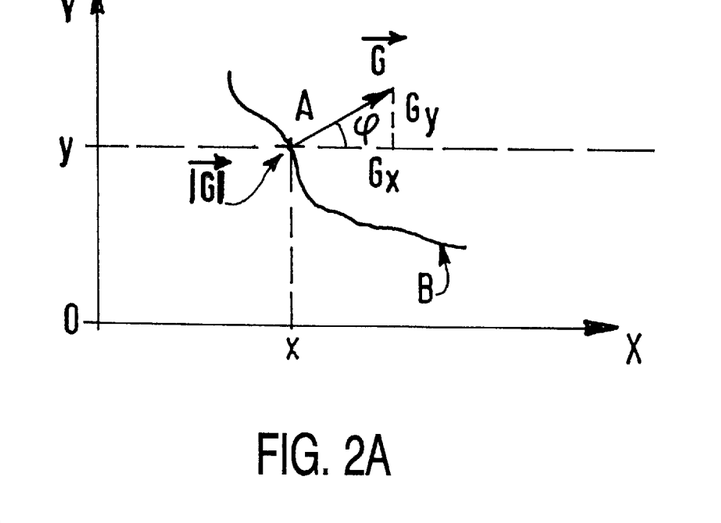
FIGS. 2A and 2B illustrate the determinations of states.

Referring to FIG. 2A, for example for the detection of a filiform object which is a boundary line of an arbitrary object in the original image J, therefore, the oriented local intensity characteristics are preferably the modulus of the intensity gradient $\|\vec{G}\|$ in A and the orientation $\phi$ of the gradient vector $\vec{G}$ calculated with respect to one of the co-ordinate axes $\overrightarrow{OX}$. These calculations are preferably performed, by way of example, by conventional systematic scanning of the original image by means of filters for deriving intensity values, which filters are referred to as Sobel filters which determine the slope, called Gx, of the intensity values as from a given pixel A in the direction $\overrightarrow{OX}$, and the slope, called Gy, of the intensity values as from the same pixel A in the direction $\overrightarrow{OY}$.

At the end of the step 20 the components of the gradient vector, or intensity slopes, Gx and Gy provide:

the modulus of the intensity gradient: $\|\vec{G}\|=\sqrt{G_x^2+3\overline{0G_y^2}}$ the angle $\phi$ enclosed by the gradient vector $\vec{G}$ with respect to the axis $\overrightarrow{OX}$, taken as a point of reference: $\phi$=Arctg (Gy/Gx).

Thus, "states" are obtained which relate to the pixels of the original image J and form a "field of oriented local intensity characteristics" or "state field", or intensity vector field, forming an image of states.

In the case of three-dimensional image acquisition, place with three dimensions, the gradient is calculated in a volume instead of in a plane, and the continuation of the processing operation is automatically adapted to such data as will be known to those skilled n the art.

The invention is not restricted to the detection of boundary lines. Any lint can be detected automatically, provided that with each pixel location in the image there is associated an intensity vector which is defined by its modulus and its orientation angle and is descriptive of the line in its environment.

Figure 2B:
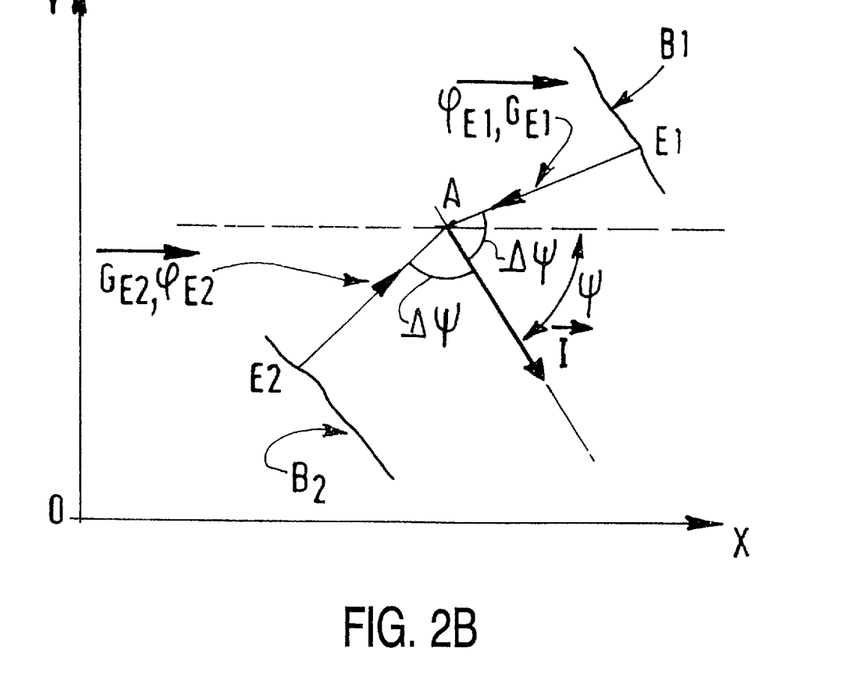

Referring to FIG. 2B, showing a second example, median lines of blood vessels are to be searched in an arteriogram. To this end, for example first the boundary lines of the vessels can be determined by means of a known gradient method. It is thus possible to determine two points E1, E2 at opposite boundaries B1, B2 of a vessel for which there are calculated the gradient vector $\vec{G}_{E1}$, associated with an angle $\phi_{E1}$, and the gradient vector $\vec{G}_{E2}$, associated with an angle $\phi_{E2}$, respectively. A (x,y) is then a point on the median line of the vessel; it is situated at the point of intersection of the directions of the gradient vectors $\vec{G}_{E1}$, $\vec{G}_{E2}$. This point has oriented local characteristics which are formed by its intensity I(x,y), calculated or measured, and by an angle $\psi$ which is enclosed by the bisectrix of the gradient vectors $\vec{G}_{E1}$ and $\vec{G}_{E2}$ to the reference $\overrightarrow{OX}$. Thus, for the potential median points in the step 20 there is formed an image of states which consists of a "field of oriented local intensity characteristics" or a state field or intensity vector field.

Figure 3:
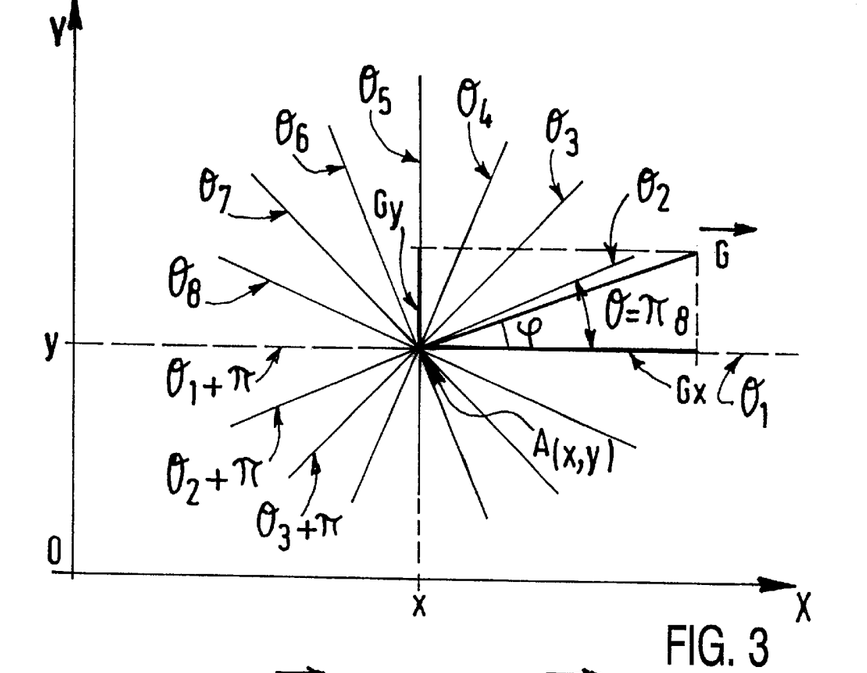
FIG. 3 illustrates the discretization of the angle characteristic during the determination of states.

Referring to FIG. 3, in order to simplify the calculations it may be elected to discretize the angle $\phi$ or $\psi$ of the intensity vector considered, for example in the directions $\theta_1$ to $\theta_8$ and $\theta_1+\pi$ to $\theta_8+\pi$, from $\pi/8$ to $\pi/8$.

Generally speaking, a state is defined by at least a location x,y and an intensity vector $\vec{V}$, i.e. use is made of two components which are the intensity modulus $\|\vec{V}\|$ of the vector and an angle $\theta$ of the orientation of $\vec{V}$ with respect to a reference $\overrightarrow{OX}$, preferably discretized.

In step 30 the method chains pixels relating to a filiform object of the original image. Chaining is an operation which consists of determining, successively from a given pixel, path which is formed by pixels of a filiform object and which is as long and as regular as possible in the original image. To this end, for a given pixel there is first determined a predecessor pixel which relates to such an as long and as regular as possible path, after which on the basis of this predecessor there is determined a predecessor of the predecessor relating to this path. Subsequently, all pixels having states which can be found with this condition are successively associated, and a chain of pixels is obtained which best represents the corresponding filiform object in the original image. Hereinafter there will be given selection criterion which enables determination, on the basis of a state linked to a given pixel, the predecessor state, if it exists, which is linked to a predecessor pixel which forms part of such an as long and as regular path as possible. On the basis of a state linked to a given pixel, this criterion eliminates the states linked to potential predecessor pixels which would lead to the construction of short and/or irregular paths, and it determines, if it exists, a state which is linked to a potential predecessor pixel which enables the construction of the shortest and most regular path possible.

In order to enhance the detection of filiform objects, in comparison with the state of the art the invention imposes more severe constraints as regards the matching of a given state and a preceding state but nevertheless ensures that the chaining operation 30 is perform by means of an as small as possible number of sub-steps as well as in an automatic fashion. The problems are solved by carrying out a filtering operation on the state image by means of a filter which is applied to a given pixel having a state i, said filter being defined by a core expressed by the following formule:

$$\Sigma\beta P(j)\exp(-C_{ij}), \text{ where } C_{ij}=\Sigma a_{lm} \tag{1a}$$

resulting in a criterion for selecting a potential predecessor state for a given state, expressed as:

$$Q(i)=\Sigma\beta P(j) \exp(-C_{ij}) \tag{1b}$$

where (i) is the filtered intensity value of a state i in relation to the given pixel, for example the value of $\|\vec{V}\|$ in i after filtering, written as $\|\vec{V}_i\|_F$, where P(j) is the non-filtered intensity of a state j relating to a potential predecessor pixel, for example the non-filtered value of $\|\vec{V}\|$ in j, written as $\|\vec{V}_j\|$, where $a_{lm}$ is a measure of disparity between adjacent states, written as l,m, situated on the path linking i to j, and where $C_{ij}$ is the cost of the path linking i to j which is obtained while evaluating a sum $\Sigma$ of the disparities between the adjacent states situated on the path relating i to j. The paths retained are determined by optimization of the criterion (1) which is obtained when the cost of the path $C_{ij}$ is low and the density of states on this path is high. The optimization of this criterion enables determination of said longest and most regular path.

It appears that the execution of the criterion (1) takes up too much calculation time. Therefore, the method according to the invention proposes the execution of the following recursive criterion:

$$Q(i)=\beta P(i)+\alpha Q(j) \quad (2)$$

which, from a mathematical point of view, is completely equivalent to the criterion (1) as can be readily deduced by those skilled in the art. The filtering by means of the criterion (2) constitutes a recursive algorithm which forms a sum of P(i), being the non-filtered state i, for example $\|\vec{V}_i\|$, and Q(j) which is a filtered state linked to a retained predecessor pixel j, written as $\|\vec{V}_j\|_F$ which is weighted by a factor $\alpha=\alpha_{ij}$, expressing the probability of matching, in order to produce Q(i) which is the filtered state i, for example $\|\vec{V}_i\|_F$. The criterion (2) is implemented by means of a number of operations which is smaller than that for the criterion (1); as is shown in FIG. 1B, it includes the sub-steps of:

defining (31) for two given states i and j, a probability of matching $\alpha_{ij}$ which is written as: $\alpha_{ij}=\exp(-a_{ij})$, where $a_{ij}$ is a measure of disparity between two given states i,j;

locally initializing (32) the criterion Q(i) in conformity with the formula $Q(i)=\beta.P(i)$, where Q(i) is the intensity value of the filtered state i, written as $\|\vec{V}_i\|_F$, where $\beta$ is a constant and where P(i) is the intensity value of the not yet filtered state i, written as $\|\vec{V}_i\|$, scanning (33) the state image in a conventional manner in at least one direction, written as $\vec{Z},1$ searching (34), in the already scanned zone, a predecessor state, written as state k(i), for which the criterion Q(i) is maximum, and storing the state k(i) corresponding to this maximum.

The filtering according to the criterion Q(i) detects continuous states, that is to say a continuous vector field. For example, in the case of edge detection, this filtering operation detects the continuous gradient fields. This filtering operation determines the most probable predecessor state k(i) which must be linked to the state i, i.e. automatically and at the lowest cost.

Figure 4A:
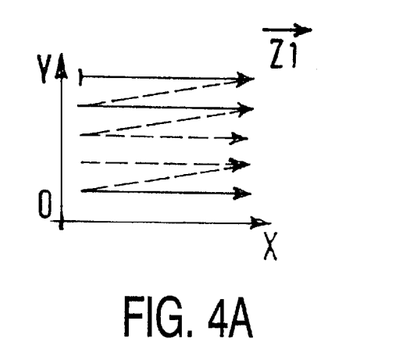
FIGS. 4A to 4D show an example of automatic scanning of the image of the states

Referring to FIG. 4A, in order to automate the chaining step the state image is automatically scanned in at least one direction. For example, a conventional scanning operation can be performed in the state image along the lines in the direction $\vec{Z}1$, parallel to the axis $\overrightarrow{OX}$, from the top left to the bottom right in the causal sense. Such scanning enables determination of the predecessor state k(i) in the already scanned region of the image which is situated higher or more to the left than the current state i being scanned.

Figure 4B:
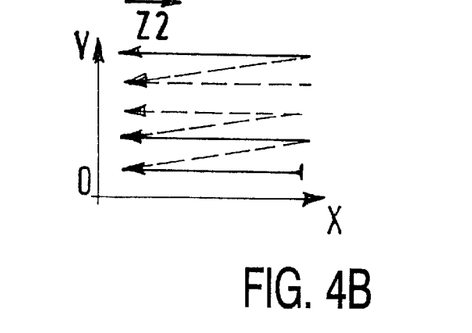

Referring to FIG. 4B, after a first causal passage along $\vec{Z}1$, parallel to $\overrightarrow{OX}$, the state image is subsequently preferably automatically scanned along the lines in the anticausal direction $\vec{Z}2$, from the bottom right to the top left of the state image, parallel to $\overrightarrow{OX}$. This second scan enables determination of a successor state h(i) for the current state i being scanned.

Figure 4C:
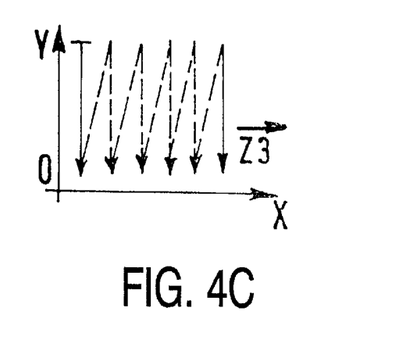
Figure 4D:
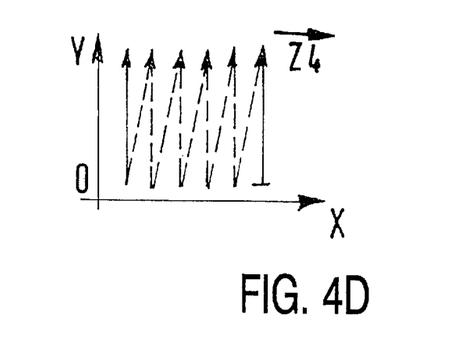

Referring to FIGS. 4C and 4D, systematic causal and anticausal scans are preferably performed also in the directions $\vec{Z}3$ and $\vec{Z}4$, perpendicular to the directions $\vec{Z}1$ and $\vec{Z}2$ of the first scans. In the cited example, in which the first systematic scans are performed along the lines parallel to the axis $\overrightarrow{OX}$, the second systematic scans are performed in a causal and anticausal manner along columns parallel to the axis $\overrightarrow{OY}$.

Figure 5A:
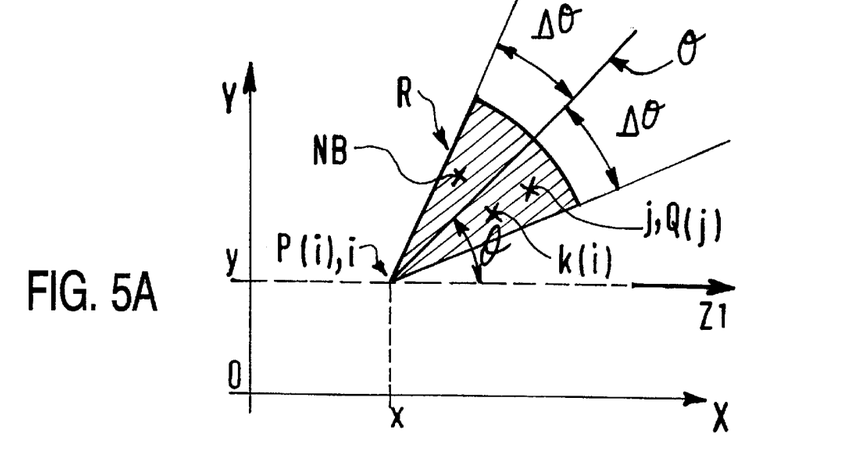
FIGS. 5A, 5B represent search sectors.
Figure 5B:
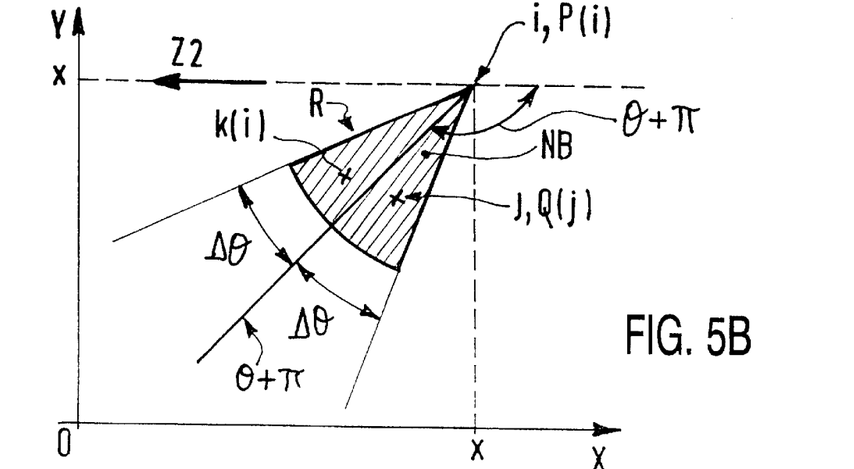

Referring to FIGS. 5A, 5B, one of the characteristics of the state field being angle $\theta$ of a vector $\vec{V}$ in relation to the axis $\overrightarrow{OX}$, for example, a vicinity is determined in the region of the state image which has already been scanned, and is formed by an angular search sector which is referred to as NB, is centered around the scanned state i, and encloses an angle $\pm\Delta\theta$ around the direction $\theta$ of the vector $\vec{V}$. Because of this vicinity NB, the best neighbor state can be searched in a continuous vector field. In the case of detection of edges, a state j is searched which maximizes the criterion (2), i.e. whose angle $\theta$ is near to that of the given state i, and for which the disparity measure $a_{ij}$ enables, in co-operation with the value of the modulus of the gradient $\|\vec{G}_j\|_F$ in j and the value of the modules of the gradient $\|\vec{G}_i\|$ in i, a maximum $\|\vec{G}_j\|_F$ to be obtained by application of the criterion (2).

When the angle $\theta$ is discretized from $\pi/8$ to $\pi/8$, preferably an angular sector delimited by $\pm\Delta\theta=\pm\pi/8$ is chosen. Depending on the orientation $\theta$ of the vector $\vec{V}_i$ the current state i, there will be as many search sectors NB as there are discretized orientations $\theta$ as shown in FIG. 3.

In order to ensure that the disparity measurement $a_{ij}$ remains reasonable, the vicinity in the search sector NB is also limited to a maximum distance R between the neighbor state j examined and the current state i scanned. For example, in this case there may be from 10 to 100 possible neighbor states j in the angular sector NB determined. To this end, or each scanned current state i from 10 to 100 corresponding tests are made in the already scanned region and on the states j contained in the vicinity NB determinedly application of the criterion (2). From among all STATES j tested in the search vicinity NB, that one i retained which maximizes the criterion Q(i); this state is referred to as k(i).

Generally speaking, the chaining consists in finding, for a current state i and in an already scanned region of the state image, a state k(i) from among the states j of a search sector NB whose direction $\theta$ is determined in dependence on the angle $\theta$ relating to the current state i, so that the oriented local characteristics linked to k(i) enable optimization of the criterion (2) in conformity with the expression:

$$\|\vec{V}_i\|_F=\beta\|\vec{V}_i\|+\alpha_{ij}\|\vec{V}_j\|_F \quad (3)$$

As a result, the best neighbor state k(i) for the given state i, in this vicinity, is localized, by such scanning and application of this criterion, at a distance which is smaller than R and characterized by an intensity vector in a continuous vector field; this state is called predecessor k(i) so as to be chained to the state i. In the sub-step 35 the information that this state k(i), producing maximum filtered Q(i) for the state i, is the best predecessor of the state i is stored.

After the sub-steps 33 to 35, commencing with a causal scan 33, the sub-steps 33 to 35 are repeated while commencing with an anticausal scan, enabling determination, using the same method, of a successor state which is stored and referred to as h(i). Subsequently, the sub-steps 33 to 35 are repeated with causal and anticausal perpendicular scans, and it is tested whether a state j exists, still within the predetermined vicinity NB, which would yield a better value Q(i). In that case it will be the new state value j that will be stored for k(i) or h(i), and the value found during the preceding scans in the sub-step 33 to 35 is deleted.

The invention is not restricted to the matching of states determined with the same resolution. The original image can be attractively filtered with different resolutions, referred to as scales σ, in order to form a set of multi-scale images; in that case the best neighbor states are searched with the different scales, the scales which are nearest nevertheless being privileged, for example, by assigning an appropriate weight to the value Q(j) in he equation (2).

The path determined by the proposed chaining method has specific properties; therefore, the filtering operation enabling this path to be obtained is called GEODESIC FILTERING in analogy with a geographic notation. The determination of this path enables the filling-in of small cuts in the filiform object in the image, because the best neighbor state found in the vicinity determined is not necessarily the state which is situated at the shortest it distance but rather the state which is situated at a short distance as a function of the oriented local intensity characteristics with a small disparity. On the other hand, the method does not enable the filling-in of large cuts, thus enabling the separation of two different filiform objects. Such geodesic filtering is "limited" by conditions in respect of location, angle and intensity and occasionally of scale, which conditions are linked to the scanning, to the search sector and to the proposed criterion (2), and enhances the elongate or filiform objects.

Figure 6:
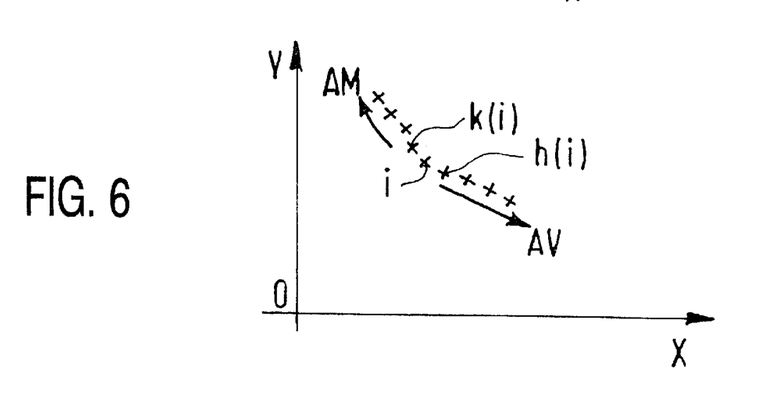
FIG. 6 illustrates tracking by means of the method, FIG. 7A show an original arteriogram

In step 40 the method performs automatic back-tracking. In this step, the states corresponding to the various filiform objects of the image are chained. Referring to FIG. 6, the automatic back-tracking includes a first determination of a point i of the image for which the largest value Q(i) has been found. On the one hand, there is formed an upstream chain AM with the predecessor, followed by the predecessor of the predecessor etc.; this is continued until no further predecessor is found. On the other hand, starting from the same point i there is formed a downstream chain AV with the successor, the successor of the successor etc.; this is continued until no further successor is found. The automatic back-tracking subsequently includes a second determination of another image point for which an as large as possible value Q(i) has been found and wherefrom there are formed a new upstream chain and a new downstream chain. Automatic back-tracking operations are continued for as long as starting points for chaining are found which have a sufficiently large value Q(i): a threshold may be imposed. Paths already visited are not visited again. To this end, the feasible new starting points for chaining are not retained unless they are situated at a predetermined adequate distance from already existing chains. Thus, filiform objects which cross one another are individually detected in the image. There cannot be any ambiguity in the segmentation of the objects. FIG. 4B shows, after a visualization step 50, an image K in which filiform objects of the image J of FIG. 4A have been chained.

Figure 8:
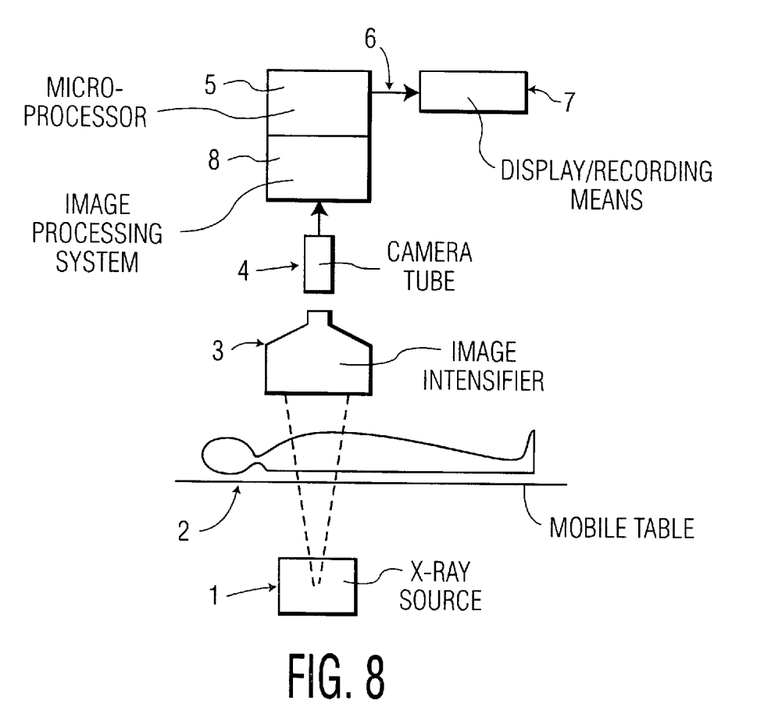
FIG. 8 shows an X-ray apparatus for carrying out the method.

FIG. 8 shows, by way of example, a digital radiography apparatus which includes an X-ray source 1, a mobile table 2 for receiving a patient, and an image intensifier device 3 which is coupled to a camera tube 4 which applies data to a digital image processing system 8 which comprises a microprocessor 5. The latter has several outputs, one output 6 being coupled to a monitor 7 for the visualization of the radiographic image or intensity images.

The digitized radiographic image may comprise 512×512 or 1024×1024 pixels coded on 8 bits or 10 bits. Each pixel can thus be assigned one of 256 or 1024 intensity levels. For example, the dark regions have a low intensity level and the bright regions of the image have a high intensity level. The digitized image can be acquired in the fluoroscopy mode. The invention can be used specifically for the processing of arteriographic images.

The various steps and operations of the digital image processing method described above are carried out in the system 5. The data is stored in a memory zone (not shown) and is displayed, if necessary, on a monitor 7. Recording means, also denoted by the reference numeral 7, may also be used. The digitization of the image to be processed offers an advantage in the implementation of the present method.

What is claimed is:

1. An image processing method which includes acquiring an intensity image formed by a matrix of points having non-binary intensity values, representing filiform objects, which method also includes steps for detecting filiform objects comprising:

determining automatically a field of intensity vectors, forming an image of states comprising characteristics including the magnitudes and angles of intensity vectors at the various points of the intensity image, and chaining the points of an individual filiform object by means of automatic filtering of the image of the states, thus performing a selection of a dense and continuous field of intensity vectors corresponding to points of the filiform object, wherein chaining by automatic filtering of the image of the states comprises:

defining a criterion for filtering which yields the filtered value of the magnitude of the intensity vector at a given state point of the image of the states as a sum of the non-filtered magnitude of the intensity vector at this point and of the filtered magnitude of the intensity vector at a neighboring state point, weighted by a coefficient of probability of matching of the state points in dependence on a measure of their disparity, and searching a point from among the neighboring state points whose characteristics including the magnitude and angle of the intensity vectors maximize the filtering criterion at the given state point.

2. A method as claimed in claim 1 which also comprises individual back-tracking of the state points of different filiform objects.

3. A method as claimed in claim 1, in which chaining further comprises:

systematic and automatic scanning of the image of the states in at least one direction;

searching at a current state point in the already scanned zone of the image, for a predecessor state point and/or a successor state point for which the criterion is maximum; and storing said predecessor and/or successor state points as points to be chained with said current point.

4. A method as claimed in claim 3 which also comprises individual back-tracking of the state points of different filiform objects.

5. A method as claimed in claim 3, in which searching a predecessor state and/or a successor state for a given state in the image of the states comprises determining a search vicinity formed by an angular sector which is centered on said given state point and covers a given angle around the orientation angle of the intensity vector relative to the given state point, and determining, within this search vicinity, of a state point among the state points of the search sector for which the criterion is maximum.

6. A method as claimed in claim 5 which also comprises individual back-tracking of the state points of different filiform objects.

7. A method as claimed in claim 5, in which the search vicinity is also limited to a zone of predetermined radius around the current point.

8. A method as claimed in claim 7 which also comprises individual back-tracking of the state points of different filiform objects.

9. An image processing method which includes acquiring an intensity image formed by a matrix of points having non-binary intensity values, representing filiform objects, which method also includes steps for detecting filiform objects comprising:

determining automatically a field of intensity vectors, forming an image of states comprising characteristics including the magnitudes and angles of intensity vectors at the various points of the intensity image, and chaining the points of an individual filiform object by means of automatic filtering of the image of the states, thus performing a selection of a dense and continuous field of intensity vectors corresponding to points of the filiform object including individual back-tracking of the state points of different filiform objects, said back-tracking further comprising:

determining a state point of interest, via examination of the value obtained by execution of the filtering criterion, as the starting point of a chaining operation;

chaining its predecessor and its successor and so on for all predecessors of the predecessors and successors of the successors, if any, to both sides of the starting point, thus forming a chain of points which are representative of the filiform object; and repeating these operations so as to back-track the various filiform objects of the image, subject to the condition that the starting points are chosen in such a manner that they are not mingled with points of an already existing chain.

10. A medical imaging apparatus comprising:

a system including an image acquisition device for the acquisition of data representing an image in the form of a two-dimensional matrix of points which have non-binary intensity values and are denoted by their co-ordinates in the matrix, an image processing system which includes a microprocessor which has access to the data representing the image and is provided with means for carrying out the steps of a method for detecting filiform objects including acquiring an intensity image formed by a matrix of points having non-binary intensity values, representing filiform objects, comprising the steps of:

determining automatically a field of intensity vectors where each vector corresponds to an associated point of said matrix, forming an image of states comprising characteristics including the magnitudes and angles of the intensity vectors at the various points of the intensity image, and chaining the points of an individual filiform object by means of automatic filtering of the image of the states, thus performing a selection of a dense and continuous field of intensity vectors corresponding to points of the filiform object, defining a criterion for filtering which yields the filtered value of the magnitude of the intensity vector at a given state point of the image of the states as a sum of the non-filtered magnitude of the intensity vector at this point and of the filtered magnitude of the intensity vector at a neighboring state point, weighted by a coefficient of probability of matching the state points in dependence on a measure of their disparity, and searching a point from among the neighboring state points whose characteristics include the magnitude and angle of the intensity vectors maximize the filtering criterion at the given state point; and a system for the display and/or storage of image data acquired and/or processed by said method.

* * * * *